(12) United States Patent
Pekar

(10) Patent No.: US 7,792,343 B2
(45) Date of Patent: Sep. 7, 2010

(54) ELASTIC IMAGE REGISTRATION FUNCTIONALITY

(75) Inventor: Vladimir Pekar, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 665 days.

(21) Appl. No.: 11/719,406

(22) PCT Filed: Nov. 4, 2005

(86) PCT No.: PCT/IB2005/053628

§ 371 (c)(1),
(2), (4) Date: May 16, 2007

(87) PCT Pub. No.: WO2006/054191

PCT Pub. Date: May 26, 2006

(65) Prior Publication Data

US 2008/0273779 A1   Nov. 6, 2008

Related U.S. Application Data

(60) Provisional application No. 60/628,685, filed on Nov. 17, 2004.

(51) Int. Cl.
G06K 9/00 (2006.01)
G06K 9/32 (2006.01)
G06K 9/34 (2006.01)

(52) U.S. Cl. .................. 382/128; 382/131; 382/173; 382/294

(58) Field of Classification Search .................. 382/128, 382/131, 173, 294
See application file for complete search history.

(56) References Cited

U.S. PATENT DOCUMENTS

| | | | |
|---|---|---|---|
| 5,633,951 A * | 5/1997 | Moshfeghi | 382/154 |
| 5,682,886 A | 11/1997 | Delp et al. | |
| 5,970,182 A | 10/1999 | Goris | |
| 6,539,127 B1 * | 3/2003 | Roche et al. | 382/294 |
| 6,728,424 B1 * | 4/2004 | Zhu et al. | 382/294 |
| 6,754,374 B1 | 6/2004 | Miller et al. | |
| 7,106,891 B2 * | 9/2006 | Wyman et al. | 382/128 |
| 7,627,158 B2 * | 12/2009 | Hay | 382/131 |
| 2002/0097901 A1 * | 7/2002 | Xu et al. | 382/131 |
| 2003/0063788 A1 * | 4/2003 | Boland et al. | 382/132 |
| 2003/0128890 A1 | 7/2003 | Roesch et al. | |
| 2003/0181808 A1 | 9/2003 | McKinnon | |
| 2003/0233039 A1 | 12/2003 | Shao et al. | |
| 2005/0013471 A1 * | 1/2005 | Snoeren et al. | 382/131 |

(Continued)

OTHER PUBLICATIONS

Hutton, B.—"Image registration: an essential tool for nuclear medicine"—European Journal of Nuclear Medicine, vol. 29, No. 4, Apr. 2002.*

(Continued)

Primary Examiner—Bhavesh M Mehta
Assistant Examiner—Bernard Krasnic

(57) ABSTRACT

A current diagnostic image (A) and an archived diagnostic image (B) of a common region of a patient are loaded into a first memory and a second memory. The first and second diagnostic images (A, B) are automatically aligned and registered with one another. Three 2D orthogonal views through a selected crossing point in the current image (A) are concurrently displayed along with the same three orthogonal views through the corresponding crossing point in the archived image (B) on a display. A user manually corrects alignment in the first and second sets of slices that are currently displayed on the display using local tools.

16 Claims, 3 Drawing Sheets

U.S. PATENT DOCUMENTS

2006/0204064 A1* 9/2006 Hay .................... 382/128

OTHER PUBLICATIONS

Betke, M., et al.; Automatic 3D Registration of Lung Surfaces in Computed Tomography Scans; 2001; Lecture Notes in Computer Science; vol. 2208; pp. 725-733.

Devabhaktuni, S., et al.; Elastic Image Registration of Diagnostic Brain MR and Limited View Intra Operative MR Using Mutual Information; 2003; IEEE; pp. 104-105.

Kohlrausch, J., et al.; A New Class of Elastic Body Splines for Nonrigid Registration of Medical Images; Universitat Hamburg, 2001.

MRIcro Tutorial; Nottingham Phychology; 2000; pp. 1-17.

Periaswamy, S., et al.; Differential Elastic Image Registration; TR2001-413; Dartmouth College, Computer Science.

Rajasekar, D., et al.; A Graphical User Interface for Automatic Image Registration Software Designed for Radiotherapy Treatment Planning; 2004; Medical Dosimetry; 29(4)239-246.

Rohling, R. N., et al.; Automatic Registration of 3-D Ultrasound Images; 1998; Ultrasound in Med. & Biol.; 24(6) 841-854.

Thompson, P., et al.; Elastic Image Registration and Pathology Detection; A book chapter for: Handbook of Medical Image Processing; Academic Press, 1999.

Zuk, T. D., et al.; A Comparison of Manual and Automatic Methods for Registering Scans of the Head; 1996; IEEE Trans. on Medical Imaging; 15(5)732-744.

* cited by examiner

ELASTIC IMAGE REGISTRATION FUNCTIONALITY

This application claims priority under 35 U.S.C. §371 from International PCT application Ser. No. PCT/IB05/053628 filed Nov. 4, 2005 which claims priority to U.S. provisional application Ser. No. 60/628,685 filed Nov. 17, 2004, which is incorporated herein by reference.

BACKGROUND

The present invention relates to the diagnostic imaging arts. It finds particular application in conjunction with a CT imaging system and will be described with particular reference thereto. However, it is to be appreciated that the present invention is applicable to a wide range of diagnostic imaging modalities.

In the field of medical imaging, it is often necessary to recognize changes of the object to be examined on the basis of different images of the same object. It is often desired that the images acquired at different instances should enable the physician to recognize which of the changes appearing in the imaged object are due to natural motions and deformations and which changes can be attributed to pathological changes such as, for example, tumor growth. Images of a subject which have been formed before and after an operation or treatment are routinely compared so as to assess the result of the treatment.

Typically, the images, which are formed at different instances by the same or different modalities, have to be registered by the means of scaling, rotating and the like to have the position and shape of the organs coincide. Rigid transformations are defined as geometrical transformations that preserve distances. The rigid transformations also preserve straightness of lines and all non-zero angles between straight lines. The rigid transformations are typically composed of translations and rotations. When the bending of joints and the respiratory motion constitute flexible or non-rigid motions, the anatomical object to be examined cannot be shifted to its original position by rigid transformations such as rotation and translation. In this case, an elastic registration is typically used.

In elastic registration, the image is modeled as an elastic body and the similarity between points or features in the two images act as external forces, which stretch the body. Elastic registration of images is used for a wide variety of clinical applications where images that have been acquired at different times, with different modalities, or for different patients need to be aligned with one another. The examples of images requiring elastic transformation include tumor diagnosis, surgery and treatment, where the images are typically taken at different modalities to show different aspects of the tumor, taken at different times to compare effects of pre-intervention and post-intervention images, or being matched with the anatomical atlases derived from cohorts studies.

Typically, the images are first segmented to designate a region of interest to guide the registration. After the images are segmented and common points to the two images are established, the images are registered by using the rigid transformation, as step one; and the elastic transformation, as step two. Because of the complexity of the elastic transformations, sometimes the image structures are not properly aligned. In this case, it is desirable that the user manually corrects the registration, following the elastic transform registration, by introducing deformations to the segmented surfaces in the 3D images. Generally, the manual correction of the 3D images registration is difficult as the 3D datasets include large volumes of data to be transformed following the manual deformation.

The present application contemplates a new and improved method and apparatus which overcomes the above-referenced problems and others.

SUMMARY

In accordance with one aspect of the present invention an apparatus for diagnostic imaging is disclosed. A first memory supplies a first diagnostic image. A second memory supplies a second diagnostic image. A registration routine automatically registers the first and second diagnostic images from the first and second image memories. A display concurrently displays at least a corresponding pair of 2D slices of the first and second registered diagnostic images. A means manually transforms at least one of the currently displayed 2D slices corresponding to one of the first and second registered diagnostic images.

In accordance with another aspect of the present invention a method of diagnostic imaging is disclosed. A first diagnostic image of a selected region is supplied. A second diagnostic image of the selected region is supplied. The first and second diagnostic images are automatically registered. A corresponding pair of 2D slices of the first and second registered diagnostic images is concurrently displayed. At least one of the currently displayed 2D slices corresponding to one of the first and second registered diagnostic images is manually transformed.

One advantage of the present invention resides in computational efficiency.

Another advantage resides in efficiency of correction of misregistered images.

Another advantage resides in real time display of corrected images.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
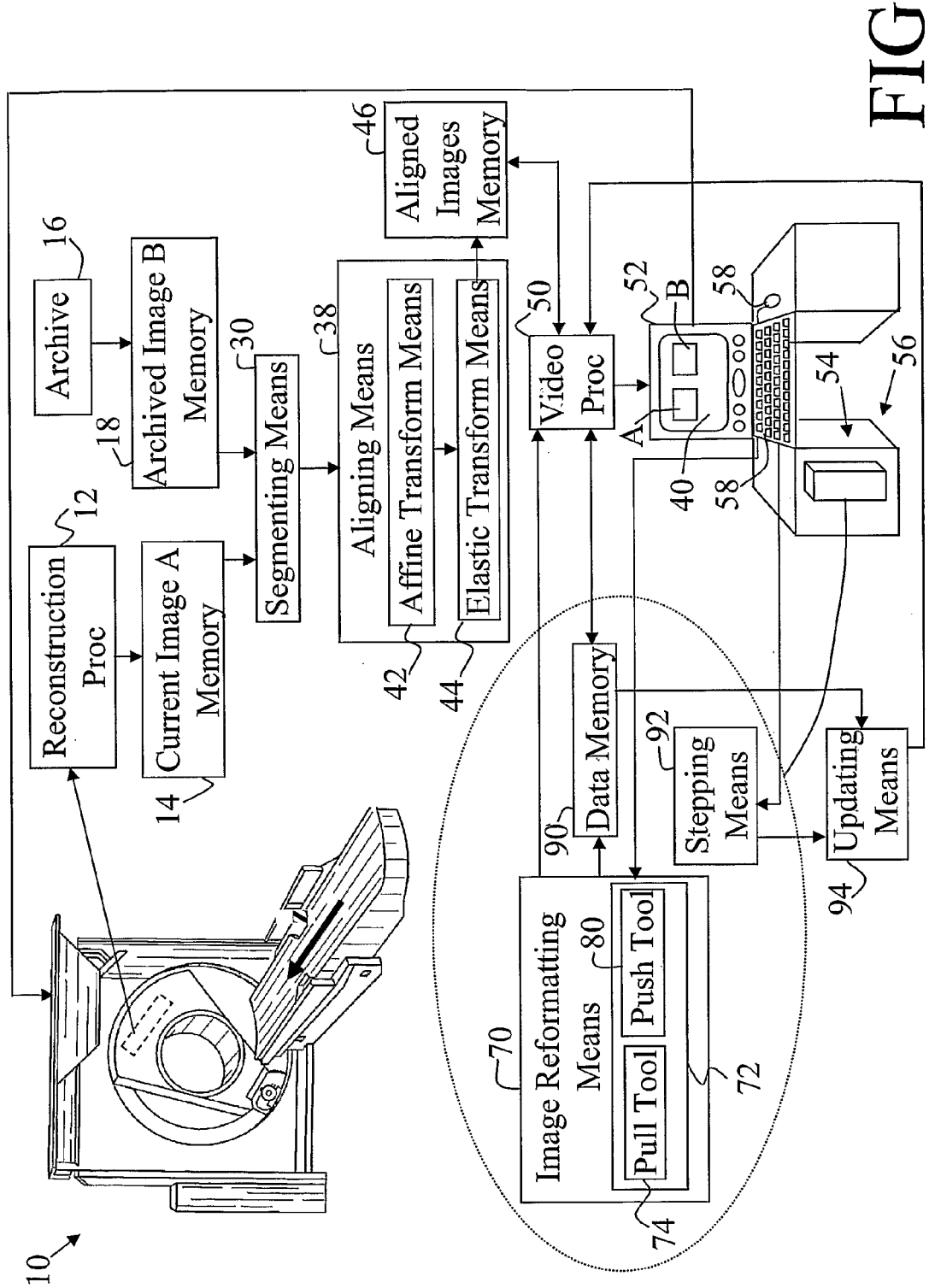
FIG. 1 is a diagrammatic illustration of a diagnostic imaging system.

With reference to FIG. 1, a subject is positioned in a diagnostic imager 10, such as a CT scanner, for a follow-up examination. The generated data is reconstructed by a reconstruction processor 12 and stored in a 3D volumetric image memory 14 (image A). Various image enhancement operations, as are known in the art, are preferably performed.

Image data from the hospital archive or from another storage medium 16 of the same region of the same subject is retrieved and stored in an archived 3D volumetric image memory 18 (image B). Of course, both the current and archive 3D image memories 14, 18 may be parts of a common storage medium.

With continuing reference to FIG. 1, a segmenting means or process 30, preferably automatically, outlines the boundaries of one or more selected anatomical structures of a region of interest of the subject. In this manner, the surface of the same selected structure(s) is defined in both images A and B. In one embodiment, a pre-determined 3D model of the region of interest or an organ to be segmented in the diagnostic image is selected. The model represents an anatomical organ such as a bladder or femur, but it may also represent a structure such as a target volume for radiotherapy. The model is used to aid automated image segmentation by providing knowledge of the organ shape as an initial starting point for the automated segmenting process 30.

An aligning means or process 38 registers the images A, B for a concurrent display on one or more monitors or displays 40. More specifically, an affine transform means 42 performs a first step of the aligning process 38 and approximately aligns images A, B by determining a misalignment between point landmarks in the current and archived 3D images A, B. Specifically, the affine transform means 42 searches for the most distinguished anatomical features in the segmented areas of the images A, B such as characteristic portions of the body around the region of interest, e.g. unique locations on the skull or the vertebrae, and determines an affine transform between the misaligned landmarks. Alternatively, the affine transform means 42 searches for the fiducials or imagable markers that have been affixed to the subject closely adjacent the region of interest. When such common points are determined, the affine transform means 42 applies appropriate algorithms, known in the art, to align the images A, B. In one embodiment, the affine transform means 42 determines nine rotational components about three orthogonal axes and three translational components along the three axes that define the registration error. Optionally, a scaling parameter can also be determined.

An elastic transform means 44 performs a second step of the aligning process 38 by a use of a point based elastic registration. More specifically, the elastic transform means 44 determines misalignment between the landmarks caused by non-rigid motions and the like and applies a closed-form elastic transformation to the misaligned landmarks. More specifically, the closed-form Gaussian elastic transformation uses the Gaussian-shaped forces centered at the positions of the landmarks to elastically deform the images A, B in a way that the prescribed landmark correspondences (displacements) are preserved.

The elastic transform means 44 preferably applies an elastic transform operator:

$$u(x) = x + \sum_{i=1}^{N} G(x - p_i)c_i, \text{ where}$$

$p_i$ are the positions of the $i^{th}$ landmark in the source image,
G $(x-p_i)$ denotes the basis function,
N is the overall number of landmarks in the image,
$c_i$ are coefficients which are computed by solving a system of linear equations that results from the interpolation constraints and the displacements of corresponding landmarks.

The images A, B, aligned by the affine transform means 42 and the elastic transform means 44, are stored in an aligned images memory 46.

A video processor 50 formats the aligned images A, B for display on the monitor 40 of a workstation 52 such that corresponding first and second sets of 2D slices of the aligned images A, B are displayed concurrently. A user manipulates the displayed slices using the workstation 52 which includes a CPU processor or hardware means 54 and a software means 56 for carrying out the necessary image processing functions and operations. The workstation 52 preferably includes one or more input devices 58 by the use of which the user can selectively control the workstation 52 and/or the scanner 10.

With continuing reference to FIG. 1, the user initiates an alignment correction via an image reformatting means 70 which includes a set of manual local tools 72. The image reformatting means 70 allows the user to manipulate local regions of the 2D image A to match the 2D image B (or vice versa) more accurately or in accordance with; user's preferences. Preferably, the video processor 50 includes an ortho-viewer which retrieves and displays first and second sets of 2D orthogonal slices. More specifically, the three 2D orthogonal views through a selected crossing point in the image A are displayed; along with the same three orthogonal views through the corresponding crossing point in the image B. The crossing point in either image is used to index the displayed 2D slices in both views concurrently. The user corrects alignment only in the first and second sets of slices that are currently displayed on the monitor 40. Since only maximum three 2D slices are updated per correction, the currently available hardware platforms carry out image reformatting in a substantially real-time domain. The local tools 72 comprise three main functions: selection of the local region (vertices) to be modified, the method by which the vertices are transformed, and the translation of the mouse motion into parameters defining the transformation.

Figure 3:
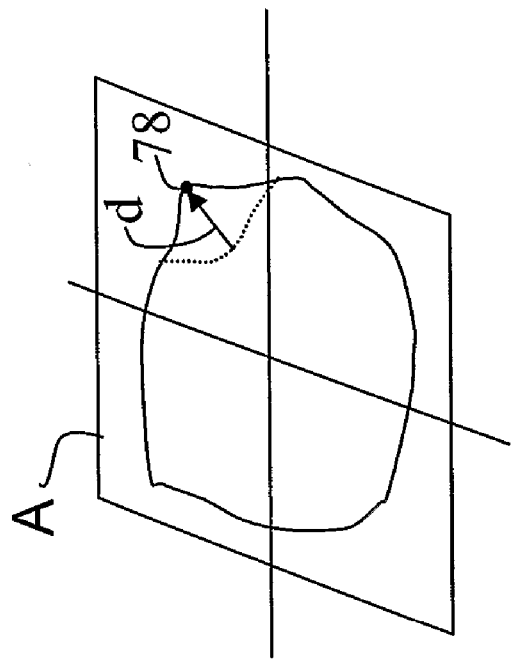
FIGS. 2-3 are graphical representations of a Gaussian pull tool.
Figure 2:
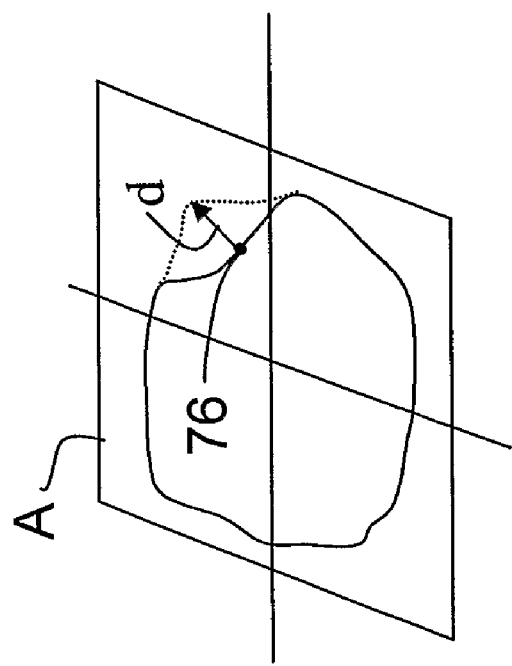

With continuing reference to FIG. 1 and further reference to FIGS. 2-3, one example of the local tool is a Gaussian pull tool 74 which deforms a 2D image A surface by pulling a selected surface by a Gaussian weighted distance of the mouse motion d. Thus, the point that is at the initial position 76 of the mouse 58 moves into position 78 the same distance d as the mouse motion d. Surface points that lie farther away from the mouse 58 move a shorter distance based on a Gaussian function scaling of the mouse motion. Typically, the tool 74 is controlled by a single Gaussian radius which defines the width of the Gaussian spread. Alternatively, the Gaussian tool 74 is controlled by separate x- and y-Gaussian radii which allow for the x-radius to be used in the plane of motion of the mouse, and the y-radius to be used orthogonally to the drawing plane. In another embodiment, the Gaussian tool 74 is controlled by a function, e.g. triangle, parabola, etc., that smoothly transitions from 1 to 0 with the appropriate set of parameters to accomplish a transformation of the selected vertices.

In one embodiment, the Gaussian pull tool 74 pulls a Gaussian shaped distortion (or other functional shape the smoothly transitions from 1 to 0) but derives the distance that the distortion is pulled from the distance of the mouse position from the 2D image plane. The 2D surface is pulled directly to the mouse position enabling smooth drawing, rather than having to click up and down on the mouse to grab and stretch the organ. Although the Gaussian is applied to the image in the displayed slices, it can affect the other two orthogonal slices if it is applied near the crossing point. Moreover, the Gaussian deformation also affects neighboring parallel slices. However, the neighboring slices are not modified at the present time. Rather, the deformation parameters in other planes are saved and the modification to the surface in each neighboring plane is made when and if such neighboring plane is called up for display.

Figure 4:
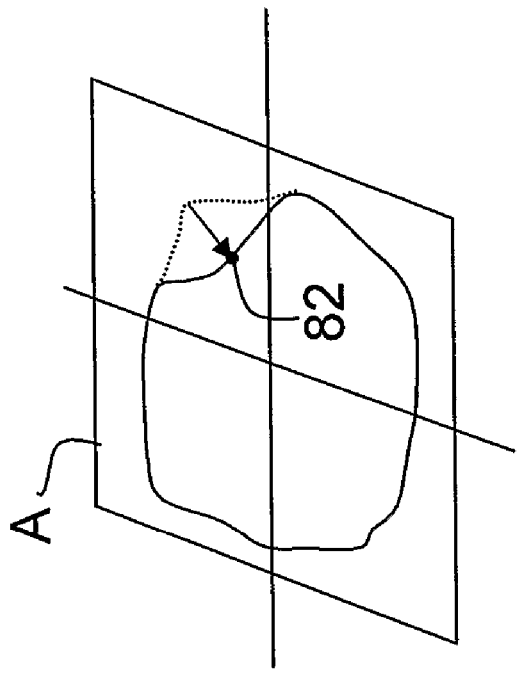
FIGS. 4-5 are graphical representations of a sphere push tool.
Figure 5:
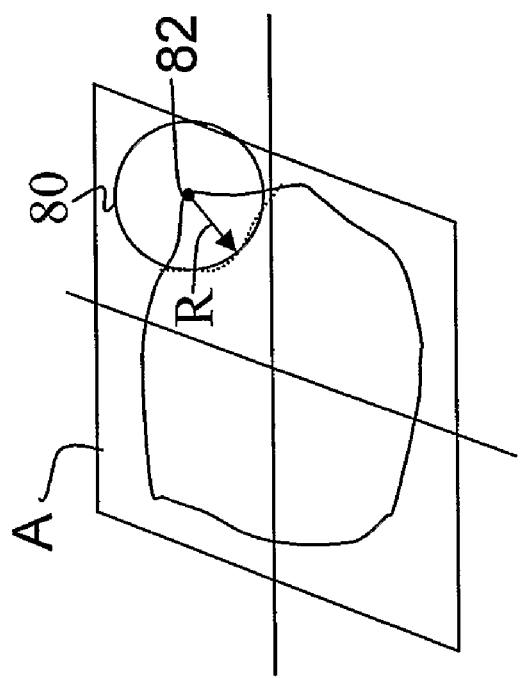

With continuing reference to FIG. 1 and further reference to FIGS. 4-5, another example of the local tool is a push tool 80, such as a push sphere which conforms the segment surface portions a specified radius R around the mouse location 82 to the surface of a sphere or circle in the displayed plane. As the mouse 58 moves the push tool 80 by moving location 82, the 2D image A is pushed either inward or outward depending on the location of the surface with respect to the mouse location 82. The illustrated sphere tool 80 is controlled by a single sphere radius parameter. In this way, the surface is deformed analogous to pressing a spherical tool of the selected radius against a soft clay surface. Of course, other surfaces of predetermined shapes such as ellipses are also contemplated.

The reformatted slices are stored in a data memory 90. Preferably, the reformatted slices are stored in a cache-conscious way to accelerate the reinspection if so requested.

The user, through the keyboard or other input device 58 controls a stepping means 92 which causes the video processor 50 to withdraw and display corresponding 2D slices from the data memory 90 on the monitor 40. When the user changes the view by scrolling through the slices, the corresponding manually transformed regions are preferably calculated and updated on the fly. In one embodiment, an updating means 94 pre-computes slices adjacent to the currently displayed corrected slices without waiting for the user interaction. If the user elects, the reformatted slices to become part of the permanent record for storage in the electronic archives, the 3D image is automatically updated. Preferably, the update of the 3D image in accordance with manual transformations of the 2D slices is done at the session closing or at the dead time. For example, the user activates a "save" option (not shown) on the monitor 40 which action initiates saving and updating of the 3D image.

In one embodiment, the corresponding slices of the images A, B are superimposed. The user uses the manual tools 72 to deform surfaces in one or both images A, B to align the image A, B with one another.

Although described with particular reference to CT scanner imaging, it is to be appreciated that this technique is also applicable to magnetic resonance images, PET images, SPECT images, and other three-dimensional diagnostic images. Moreover, the images being registered may be from mixed modalities. For example, a CT image can be registered using this technique with a PET image. When mixing modalities, care should be taken to assure that the features are defined in both imaging modalities or appropriate adjustment made. It is to be appreciated that this technique is applicable to studies of a variety of organs such as the colon, the liver, and other non-rigid organs. Moreover, this technique is also applicable to rigid portions of the body such as the head.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. An apparatus for manipulating diagnostic images, including:
    a first memory which supplies a first 3D diagnostic image;
    a second memory which supplies a second 3D diagnostic image;
    a registration routine which automatically registers the first and second diagnostic 3D images from the first and second image memories;
    a display unit which concurrently displays a spatially corresponding pair of 2D slices from the first 3D diagnostic image and the registered 3D diagnostic image;
    manual tools which are employed by a user to generate 3D deformation parameters which deform one or more surfaces of the registered 2D slice images to bring them into closer correspondence; and
    an image reformatting routine which (1) reformats only the concurrently displayed 2D slices of the registered 3D images in accordance with the deformation parameters, (2) controls the display to display the reformatted 2D slice images in real time, and (3) saves the deformation parameters for use in reformatting other slices of the 3D images.

2. The apparatus as set forth in claim 1, further including:
    a segmentation unit which segments at least a surface of at least one corresponding region of interest (ROI) in both diagnostic 3D images, the manual tools deforming portions of the segmented surface which appear in the displayed 2D slice.

3. The apparatus as set forth in claim 1, further including:
    as a user steps through the first and second 3D registered images correspondingly to display different 2D slices,
    the image reformatting routine reformats each currently displayed different 2D slice in real time in accordance with manual transformation parameters generated during deformation of nearby 2D slices.

4. The apparatus as set forth in claim 1, wherein the registration routine includes:
    an affine transformation unit which determines an affine transform representative of misalignment between the first and second 3D diagnostic images and operating on one of the first and second 3D diagnostic images in accordance with the determined affine transform to register the first and second images.

5. The apparatus as set forth in claim 4, wherein the registration routine further includes:
    an elastic transformation unit which determines an elastic transform representative of misalignment between the first and second 3D diagnostic images and operating on one of the first and second 3D diagnostic images in accordance with the determined elastic transform.

6. The apparatus as set forth in claim 1, wherein the plurality of manual tools include:
    a pull tool which deforms a portion of the surface in the registered 2D slice by pulling the portion along a predefined smooth curve; and
    a push tool which deforms a portion of the surface in the registered 2D slice by pushing a predefined smooth curve against the portion.

7. The apparatus as set forth in claim 6, wherein the predefined smooth curve is one of a Gaussian, a sphere, or an ellipse.

8. The apparatus as set forth in claim 1, wherein an input device which includes at least one of a keyboard and a mouse controls the manual tools.

9. A diagnostic imaging system, including:
    the apparatus for manipulating diagnostic images as set forth in claim 1;
    a diagnostic imager connected with the first memory which acquires the first 3D diagnostic image and transfers the acquired image to the first memory; and an image archive from which the second 3D diagnostic image, taken at an earlier time, is transferred to the second memory, the second 3D diagnostic image being a 3D segmented image.

10. A method of diagnostic imaging including:

supplying a first diagnostic 3D image of a region of interest;

supplying a second diagnostic 3D image of the region of interest;

automatically registering the first and second diagnostic 3D images;

concurrently displaying at least one pair of corresponding 2D slices of the first and second registered 3D diagnostic images, each pair corresponding to a selected corresponding crossing point;

with manual tools, inputting 3D deformation parameters which deform one or more surfaces of one or more of the registered 3D images which surfaces are in at least one displayed 2D slice and nearby not displayed 2D slices; and performing an image reformatting routine which (1) reformats only the concurrently displayed 2D slices of the registered 3D images in accordance with the deformation parameters, (2) controls the display to display the reformatted 2D slice images in real time, and (3) saves the deformation parameters for use in reformatting other slices of the 3D images.

11. The method as set forth in claim 10, further including:

prior to registration, segmenting at least one surface of the region of interest (ROI) in at least one of the diagnostic 3D images.

12. The method as set forth in claim 11, wherein the step of inputting 3D deformation parameters includes:

controlling the manual tools by a user via an input device to deform at least one of the segmented surfaces of the concurrently displayed pair of 2D slices.

13. The method as set forth in claim 12, wherein the manual tools include:

deforming a portion of the segmented surface of at least one of the concurrently displayed 2D slices by pulling the portion along a predefined smooth curve; and deforming a portion of the segmented surface of at least one of the concurrently displayed 2D slices by pushing a predefined smooth curve against the portion.

14. The method as set forth in claim 10, further including:

concurrently stepping the 2D slice pairs through the first and second registered 3D images correspondingly; and concurrently updating the stepped, currently displayed 2D slices in accordance with deformation parameters input by manual tools on a nearby 2D slice.

15. The method as set forth in claim 10, wherein the step of registering includes:

determining an affine transform representative of misalignment between the first and second diagnostic 3D images; and operating on one of the first and second diagnostic 3D images in accordance with the determined affine transform to register the first and second images.

16. The method as set forth in claim 15, wherein the step of registering further includes:

determining an elastic transform representative of misalignment between the first and second diagnostic 3D images; and operating on one of the first and second diagnostic 3D images in accordance with the determined elastic transform.

* * * * *